United States Patent
Sinha et al.

(10) Patent No.: US 10,581,100 B2
(45) Date of Patent: Mar. 3, 2020

(54) METHOD OF OPERATING A FUEL CELL STACK HAVING A TEMPORARILY DISABLED BLEED VALVE

(71) Applicant: GM Global Technology Operations LLC, Detroit, MI (US)

(72) Inventors: Manish Sinha, Rochester Hills, MI (US); Chad Dubois, Oxford, MI (US); Xiaofeng Wang, Troy, MI (US); Sergio E. Garcia, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 113 days.

(21) Appl. No.: 16/001,436

(22) Filed: Jun. 6, 2018

(65) Prior Publication Data

US 2019/0379074 A1    Dec. 12, 2019

(51) Int. Cl.
| | | |
|---|---|---|
| H01M 8/04 | (2016.01) | |
| H01M 8/04746 | (2016.01) | |
| H01M 8/0432 | (2016.01) | |
| H01M 8/0444 | (2016.01) | |
| H01M 8/04791 | (2016.01) | |
| H01M 8/04828 | (2016.01) | |
| B60L 50/72 | (2019.01) | |
| B60L 58/33 | (2019.01) | |

(52) U.S. Cl.
CPC ......... *H01M 8/04783* (2013.01); *B60L 50/72* (2019.02); *H01M 8/04358* (2013.01); *H01M 8/04447* (2013.01); *H01M 8/04761* (2013.01); *H01M 8/04798* (2013.01); *H01M 8/04835* (2013.01); *B60L 58/33* (2019.02); *B60Y 2200/91* (2013.01); *B60Y 2400/202* (2013.01); *H01M 2250/20* (2013.01)

(58) Field of Classification Search
CPC ......... H01M 8/04783; H01M 8/04358; H01M 8/04761; H01M 8/04447; H01M 8/04835; H01M 8/04798
See application file for complete search history.

(56) References Cited

U.S. PATENT DOCUMENTS

| | | | |
|---|---|---|---|
| 9,034,530 B2 | 5/2015 | Lebzelter et al. | |
| 2008/0145720 A1* | 6/2008 | Sinha | H01M 8/04089 429/432 |
| 2008/0312849 A1* | 12/2008 | Gade | H01M 8/04462 702/47 |
| 2009/0035630 A1* | 2/2009 | Kumada | H01M 8/04238 429/430 |

* cited by examiner

*Primary Examiner* — Stewart A Fraser
(74) *Attorney, Agent, or Firm* — Quinn IP Law

(57) ABSTRACT

A method of operating a fuel cell stack is described. The fuel cell stack includes a cathode, an anode, and a temporarily disabled bleed valve that is otherwise configured to transition from a first position to a second position and thereby modulate nitrogen drained from the anode. The method includes increasing a first pressure in the anode via a controller and, concurrent to increasing, decreasing a second pressure in the cathode via the controller. A system and a device including the fuel cell stack are also described.

19 Claims, 3 Drawing Sheets

METHOD OF OPERATING A FUEL CELL STACK HAVING A TEMPORARILY DISABLED BLEED VALVE

INTRODUCTION

The disclosure relates to a method of operating a fuel cell stack, and to a system and a device that include the fuel cell stack.

A fuel cell is an electro-chemical device that generally includes an anode, a cathode, and an electrolyte disposed between the anode and the cathode. During operation of the fuel cell, hydrogen gas may enter the anode and oxygen or air may enter the cathode. The hydrogen gas may dissociate in the anode to generate free hydrogen protons and electrons. The hydrogen protons may then pass through the electrolyte to the cathode, and react with oxygen and electrons in the cathode to generate water. Further, the electrons from the anode may not pass through the electrolyte but may instead be directed through a load to perform work. As such, several fuel cells may be combined to form a fuel cell stack to generate a desired fuel cell stack power output. For example, a fuel cell stack for a vehicle may include many stacked fuel cells.

One type of fuel cell stack, a polymer electrolyte membrane fuel cell stack (PEMFC), may operate at less than 100% hydrogen fuel efficiency. During operation of the PEMFC, any inert gases present in the anode may increase in concentration as the hydrogen gas is consumed. Nitrogen may also diffuse across the polymer electrolyte membrane from the cathode to the anode, which may further add to nitrogen present in the anode. Therefore, the fuel cell stack may also include a bleed valve to purge or drain a portion of the recirculating anode gas and prevent excessive buildup of nitrogen in the anode.

SUMMARY

A fuel cell stack includes a cathode, an anode, and a temporarily disabled bleed valve that is otherwise configured to transition from a first position to a second position and thereby modulate nitrogen drained from the anode. The method includes increasing a first pressure in the anode via a controller and, concurrent to increasing, decreasing a second pressure in the cathode via the controller.

In one aspect, the method may further include, concurrent to decreasing, maintaining a relative humidity of less than a threshold relative humidity in the cathode via the controller.

Increasing may include enlarging a difference between the first pressure and the second pressure to thereby equilibrate a first partial pressure of nitrogen in the anode and a second partial pressure of nitrogen in the cathode. Further, hydrogen may be present in the anode in a hydrogen concentration. Increasing and decreasing may include equalizing the first partial pressure and the second partial pressure to thereby stabilize the hydrogen concentration in the anode. The method may further include, prior to increasing, detecting via the controller that the temporarily disabled bleed valve is disposed in the first position and cannot transition to the second position.

The fuel cell stack may be configured to produce a byproduct during operation. The fuel cell stack may further include an exhaust configured for conveying the byproduct to atmosphere and an expander disposed between the cathode and the exhaust and configured for expanding the byproduct. Decreasing may further include bypassing the expander.

In another aspect, decreasing may include elevating a hydrogen concentration in the anode to greater than or equal to 10 parts by volume of hydrogen based on 100 parts by volume of a total of nitrogen and hydrogen.

Concurrent to decreasing, the method may include producing and sustaining a fuel cell stack power output sufficient to power a device for a predetermined duration while the temporarily disabled bleed valve is disposed in the first position.

The method may further include warming the temporarily disabled bleed valve to thereby transition the temporarily disabled bleed valve from the first position to the second position.

In a further aspect, the method may include, prior to increasing the first pressure, measuring a coolant inlet temperature via at least one temperature sensor, and comparing the coolant inlet temperature to a threshold temperature via a processor to define: a first condition in which the coolant inlet temperature is less than the threshold temperature or a second condition in which the coolant inlet temperature is greater than or equal to the threshold temperature. After comparing, the method may include detecting via the controller that the temporarily disabled bleed valve is disposed in the first position.

Further, decreasing may include comparing a hydrogen concentration in the anode to a threshold hydrogen concentration to thereby define: a third condition in which the hydrogen concentration is less than the threshold hydrogen concentration or a fourth condition in which the hydrogen concentration is greater than or equal to the threshold hydrogen concentration. For the third condition, the method may include decreasing the fuel cell stack power output, or, for the fourth condition, the method may include maintaining a fuel cell stack power output. The method may also include, prior to comparing the hydrogen concentration to the threshold hydrogen concentration, determining whether the fuel cell stack has reached a fully-warmed state.

A system includes a fuel cell stack including a cathode, an anode, and a temporarily disabled bleed valve that is otherwise configured to transition from a first position to a second position and thereby modulate nitrogen drained from the anode. The system also includes an electric machine electrically connected to and powered by the fuel cell stack. The system further includes a controller in communication with the fuel cell stack, having a processor, and configured to maintain operation of the fuel cell stack when the temporarily disabled bleed valve is disposed in the first position via execution of instructions by the processor. Execution of the instructions causes the controller to concurrently increase a first pressure in the anode and decrease a second pressure in the cathode.

In one aspect, execution of the instructions may further cause the controller to maintain a relative humidity of less than a threshold relative humidity in the cathode while concurrently increasing the first pressure and decreasing the second pressure.

Further, the controller may be configured to inject hydrogen into the anode to thereby increase the first pressure.

The system may also include at least one of a hydrogen concentration sensor and a hydrogen concentration model in communication with the controller and configured for estimating a hydrogen concentration in the anode. The controller may be further configured to limit a fuel cell stack power output supplied from the fuel cell stack to the electric machine to thereby increase the hydrogen concentration.

A device includes a set of drive wheels and a fuel cell stack. The fuel cell stack includes a cathode, an anode, and a temporarily disabled bleed valve that is otherwise configured to transition from a first position to a second position and thereby modulate nitrogen drained from the anode. The device also includes an electric traction motor electrically connected to and powered by the fuel cell stack, wherein the electric traction motor has an output member coupled to the set of drive wheels. In addition, the device includes a controller in communication with the fuel cell stack, having a processor, and configured to maintain operation of the fuel cell stack when the temporarily disabled bleed valve is disposed in the first position via execution of instructions by the processor. Execution of the instructions causes the controller to concurrently increase a first pressure in the anode and decrease a second pressure in the cathode.

In one aspect, execution of the instructions may further cause the controller to maintain a relative humidity of less than a threshold relative humidity in the cathode while concurrently increasing the first pressure and decreasing the second pressure.

In addition, the fuel cell stack may power the set of drive wheels for a predetermined duration while the temporarily disabled bleed valve is disposed in the first position.

DETAILED DESCRIPTION

Figure 1:
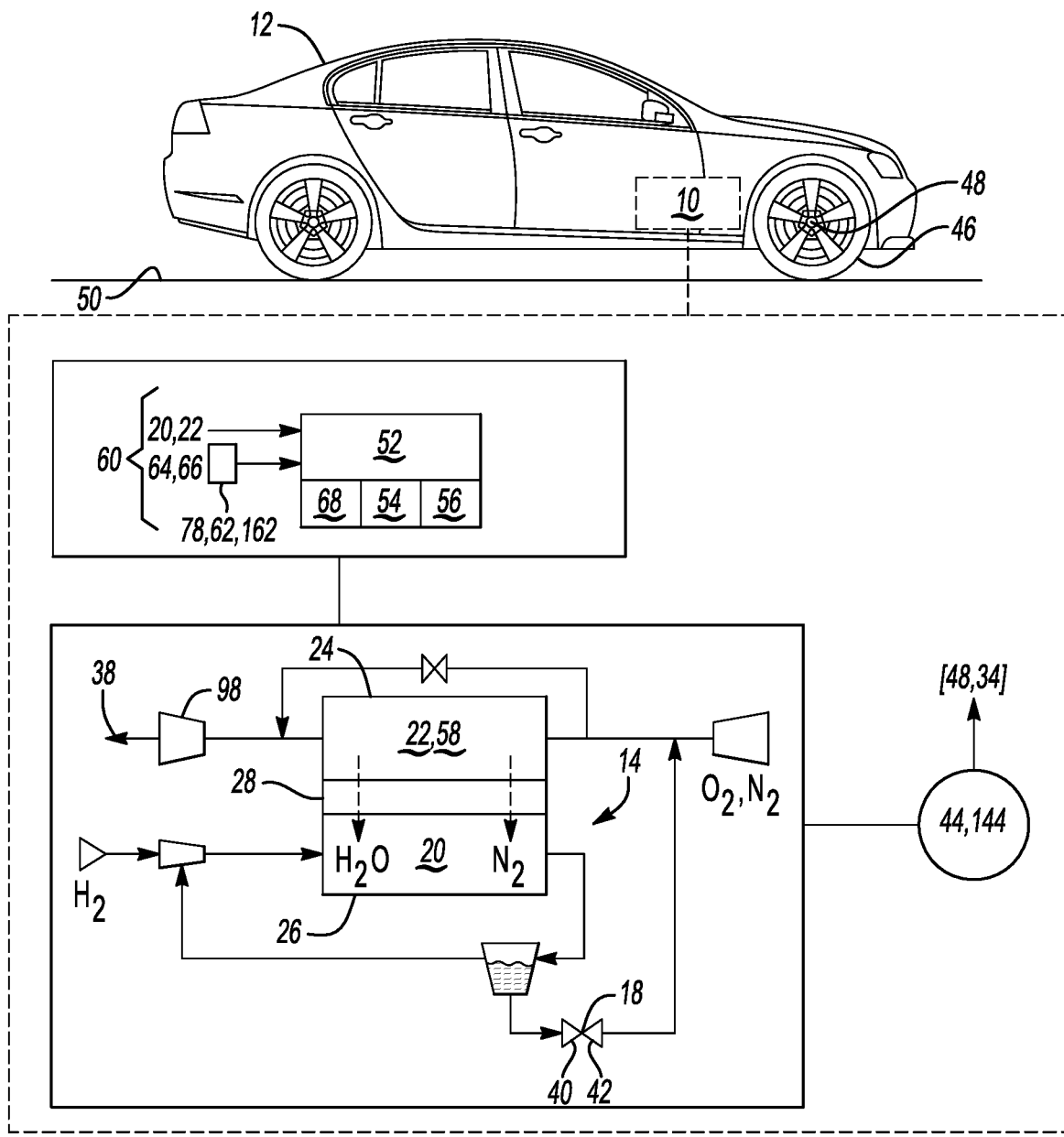
FIG. 1 is a schematic illustration of a side view of a device including a fuel cell stack and a controller in communication with the fuel cell stack.

Referring to the Figures, wherein like reference numerals refer to like elements, a system 10 and device 12 including a fuel cell stack 14 are shown generally in FIG. 1. Further, a method 16 of operating the fuel cell stack 14 is shown generally in FIG. 3. In particular, and as set forth in more detail below, the method 16 may be useful for operating fuel cell stacks 14 that include a temporarily disabled bleed valve 18 (FIG. 1), e.g., a stuck, frozen, blocked, fouled, mechanically malfunctioning, or electrically malfunctioning bleed valve 18. As such, the method 16 may be useful for maintaining operation of the fuel cell stack 14 even while the temporarily disabled bleed valve 18 is malfunctioning. Therefore, for example, the method 16, system 10, and device 12 may be particularly suitable for applications in which the fuel cell stack 14 starts up and/or operates at below-freezing temperatures such that water present at the bleed valve 18 freezes and prevents operation of the temporarily disabled bleed valve 18.

As such, the method 16, system 10, and device 12 may be useful for vehicular applications such as, but not limited to, automobiles, buses, forklifts, motorcycles, bicycles, trains, trams, spacecraft, airplanes, farming equipment, boats, and submarines. Alternatively, the method 16, system 10, and device 12 may be useful for non-vehicular applications such as stationary power generation, portable power generation, electronics, remote weather stations, communications centers, research stations, and the like. More specifically, by way of a non-limiting example, the method 16, system 10, and device 12 may be useful for polymer electrolyte membrane fuel cell applications for non-autonomous, autonomous, or semi-autonomous vehicle applications (shown generally at in FIG. 1) in which the fuel cell stack 14 is subjected to below-freezing temperatures at start-up 200 (FIG. 4) or during continued operation. For example, the method 16 may be useful for operating a fuel cell stack 14 in a device 12 such as a vehicle that has been parked for a long period in freezing temperatures and yet now requires an immediate start and drivability.

As described in further detail below, the method 16 prevents a flow of nitrogen ($N_2$) to and/or a buildup of nitrogen ($N_2$) in the anode 26 until the temporarily disabled bleed valve 18 can recover nominal functionality and again operate to modulate nitrogen ($N_2$) drained from the anode 26. In particular, the method 16 manipulates pressures 20, 22 within the fuel cell stack 14 to control nitrogen ($N_2$) flow to the anode 26 until the bleed valve 18 is no longer disabled and functions as intended to drain nitrogen ($N_2$) from the anode 26.

Figure 2:
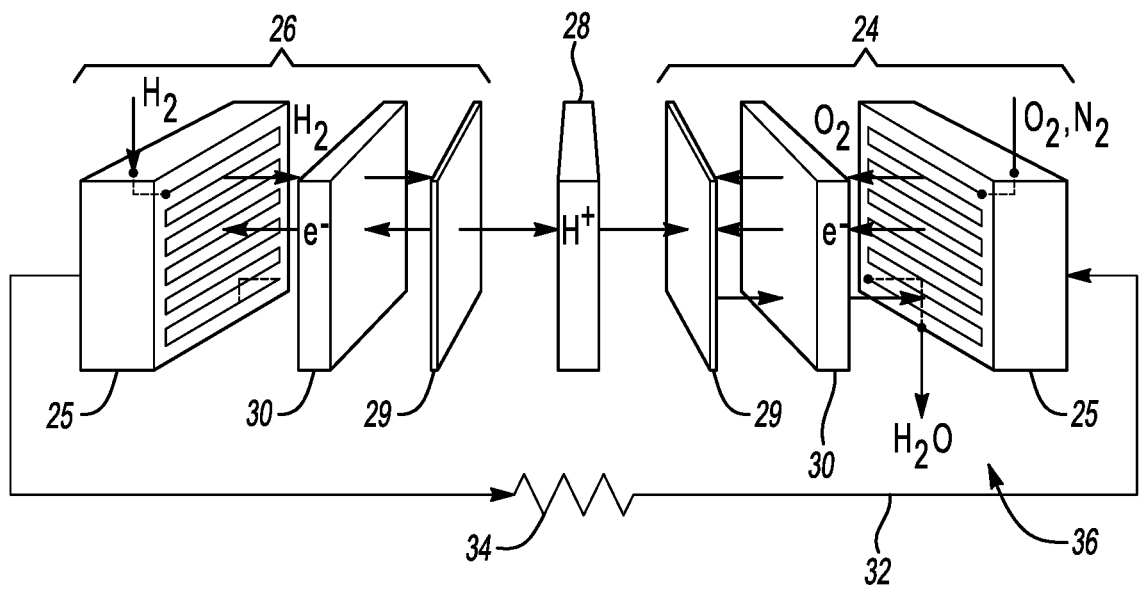
FIG. 2 is a schematic illustration of an exploded view of the fuel cell stack of FIG. 1.

More specifically, as described with reference to FIGS. 1 and 2, the fuel cell stack 14 includes a cathode 24, an anode 26, and an electrolyte 28, e.g., a polymer electrolyte membrane, disposed between the cathode 24 and the anode 26. As shown in greater detail in FIG. 2, the fuel cell stack 14 may be formed from one or more membrane electrode assemblies (MEA) that include the cathode 24, anode 26, electrolyte 28; a plurality of flow plates 25; a catalyst 29; and a plurality of gas diffusion layers 30.

During operation of the fuel cell stack 14, chemical energy from an electrochemical reaction of hydrogen ($H_2$) and oxygen ($O_2$) may transform to electrical energy. In particular, as described with reference to FIG. 2, hydrogen gas ($H_2$) may enter the anode 26 and be catalytically split into protons ($H^+$) and electrons (e) at the catalyst 29 of the anode 26. The protons ($H^+$) may permeate through the polymer electrolyte membrane 28 to the cathode 24, while the electrons (e) may not permeate the polymer electrolyte membrane 28 but may instead travel along an external load circuit 32 to the cathode 24 to produce a fuel cell stack power output 34 or electrical current. Concurrently, air, e.g., oxygen ($O_2$) and nitrogen ($N_2$), may enter the cathode 24, react with the protons ($H^+$) permeating through the polymer electrolyte membrane 28 and the electrons (e) arriving to the cathode 24 from the external load circuit 32, and form a byproduct 36, i.e., water ($H_2O$) and heat, which may be expelled through an exhaust 38 of the fuel cell stack 14. As such, nitrogen ($N_2$) present at the cathode 24 may permeate from the cathode 24 through the polymer electrolyte membrane 28 to the anode 26 during operation of the fuel cell stack 14.

Therefore, the fuel cell stack 14 also includes the temporarily disabled bleed valve 18 that is otherwise configured to transition from a first position 40 to a second position 42 and thereby modulate nitrogen ($N_2$) drained from the anode 26. In one embodiment, the first position 40 may be a closed position and the second position 42 may be an open position such that the temporarily disabled bleed valve 18 is stuck closed. That is, the second position 42 may be a nominal operating state for the bleed valve 18. Alternatively, the first position 40 may be an open position and the second position 42 may be a closed position such that the temporarily disabled bleed valve 18 is stuck open.

For example, in one embodiment, during nominal operation of the bleed valve 18, the bleed valve 18 may transition from the first position 40 to the second position 42 to drain nitrogen ($N_2$) from the anode 26. However, under some conditions, the temporarily disabled bleed valve 18 may remain in the first position 40 and may not effectively drain nitrogen ($N_2$) from the anode 26. For example, the temporarily disabled bleed valve 18 may be stuck, frozen, clogged, blocked, or otherwise mechanically or electrically unable to drain nitrogen ($N_2$) from the anode 26.

Alternatively, in another embodiment, during nominal operation of the bleed valve 18, the bleed valve 18 may transition from the first position 40 to the second position 42 to modulate, e.g., prevent, nitrogen ($N_2$) drainage from the anode 26. However, for this embodiment, under some conditions, the temporarily disabled bleed valve 18 may remain in the first position 40, e.g., may remain stuck open, and may not effectively restrict nitrogen ($N_2$) drainage from the anode 26.

Further, although not shown, the fuel cell stack 14 may include one or more cooling systems configured for co-currently flowing a coolant with the air fed to the cathode 24 so as to maintain a desired operating temperature of the fuel cell stack 14.

Referring again to FIG. 1, the system 10 and device 12 include the fuel cell stack 14 and an electric machine 44 electrically connected to and powered by the fuel cell stack 14. Suitable non-limiting examples of electric machines 44 may include permanent magnet direct current motors, alternating current motors, direct current generators, alternating current generators, Eddy current clutches, Eddy current brakes, rotary converters, hysteresis dynamometers, transformers, and the like. For example, the electric machine 44 may be an electric traction motor 144 for a device 12 having an at least partially-electric drivetrain. Motor torque generated by the electric machine 44 may be used to propel the device 12, e.g., a vehicle, start an internal combustion engine, and/or perform other high-voltage functions.

In a vehicle in particular, a given electric machine 44 may be configured as an electric traction motor 144 that outputs torque that ultimately propels the vehicle. That is, the device 12 may include a set of drive wheels 46 and the electric traction motor 144 may have an output member 48 coupled to the set of drive wheels 46. For example, the electric machine 44 may be energized or powered by the fuel cell stack power output 34 (FIG. 2) produced during the above-described reaction of hydrogen ($H_2$) and oxygen ($O_2$) within the fuel cell stack 14 such that the energized electric machine 44 produces output torque via the output member 48.

In particular, by way of a non-limiting vehicular example, the output member 48 may be coupled to the set of drive wheels 46 of the device 12, e.g., via a planetary transmission or gear box (not shown). The generated output torque may be delivered to the set of drive wheels 46 while the set of drive wheels 46 is in rolling contact with a road surface 50 such that the electric machine 44 ultimately propels the device 12 or vehicle in some modes of operation.

For example, in "mild hybrid" or extended-range electric vehicle embodiments, the vehicle may have an internal combustion engine connected to the electric machine 44 via a belted drive arrangement, such that when the electric machine 44 is powered by the fuel cell stack 14, the electric machine 44 is operable for cranking and starting the engine, for regenerative braking, for other power generation, and the like. In particular, as set forth in more detail below, the fuel cell stack 14 may power the set of drive wheels 46 for a predetermined duration, e.g., at least 5 minutes or at least 15 minutes or at least 30 minutes or at least one hour, while the temporarily disabled bleed valve 18 is disposed in the first position 40. That is, the method 16, system 10, and device 12 may allow continued operation of the fuel cell stack 14 for the predetermined or desired duration even while the bleed valve 18 is frozen or otherwise temporarily disabled and stuck in the first position 40, i.e., even while nitrogen ($N_2$) cannot drain from the anode 26 through the temporarily disabled bleed valve 18. Further, although shown for simplicity in FIG. 1 as a single electric machine 44 configured as an electric traction motor 144, the system 10 and device 12 may also include a plurality of separate electric machines 44 each sized and configured for a respective task.

With continued reference to FIG. 1, the system 10 and device 12 also include a controller 52 in communication with the fuel cell stack 14, having a processor 54, and configured to maintain operation of the fuel cell stack 14 when the temporarily disabled bleed valve 18 is disposed in the first position 40 via execution of instructions 56 by the processor 54. In particular, as set forth in more detail below, execution of the instructions 56 causes the controller 52 to concurrently increase a first pressure 20 in the anode 26 and decrease a second pressure 22 in the cathode 24. For example, although again set forth in more detail below, the controller 52 may be configured to inject hydrogen ($H_2$) into the anode 26 to thereby increase the first pressure 20. Further, execution of the instructions 56 may also cause the controller 52 to maintain a relative humidity 58 of less than a threshold relative humidity in the cathode 24 while concurrently increasing 70 (FIG. 3) the first pressure 20 and decreasing 72 (FIG. 3) the second pressure 22. For example, the threshold relative humidity may be predetermined according to a humidity calibration model and may be less than 100%. That is, the threshold relative humidity may be less than or equal to 90% or less than or equal to 80% or less than or equal to 70% or less than or equal to 60%.

Stated differently, the system 10 and device 12 may be regulated by the controller 52. As part of a regulating function, the controller 52 may be programmed with computer-readable instructions 56 embodying the method 16 for operating the fuel cell stack 14, and for therefore controlling an operation of the fuel cell stack 14 and/or the device 12 or vehicle using the fuel cell stack 14. Again, while a vehicular application is described with reference to FIG. 1, a wider range of possible fuel cell stack 14 applications may benefit from the described teachings, including power plants and mobile platforms, as well as other power generating equipment.

As part of the method 16, the controller 52 may be programmed to determine a set of input values (arrows 60) and, using the received input values (arrows 60), to control operation of the fuel cell stack 14, system 10, and/or device 12. As described below, the input values (arrows 60) may be relayed to the controller 52 by at least one temperature sensor, pressure sensor, flow sensor, hydrogen concentration model 62, hydrogen concentration sensor 162, nitrogen concentration sensor, relative humidity sensors, electric current sensors, fuel cell stack power output sensors, and the like, and may include, e.g., the first pressure 20, the second pressure 22, the relative humidity 58 within the cathode 24, a coolant inlet temperature 64 (FIG. 4), a hydrogen concentration 66 (FIG. 4) in the anode 26, the fuel cell stack power output 34 (FIG. 2), and the like.

In order to perform assigned functions, the controller 52 includes the processor 54 and may include memory 68. The memory 68 may include tangible, non-transitory memory, e.g., read only memory, whether optical, magnetic, flash, or otherwise. The controller 52 may also include sufficient amounts of random access memory, electrically-erasable programmable read only memory, and the like, as well as high-speed clock, analog-to-digital and digital-to-analog circuitry, and input/output circuitry, as well as appropriate signal conditioning and buffer circuitry.

Figure 3:
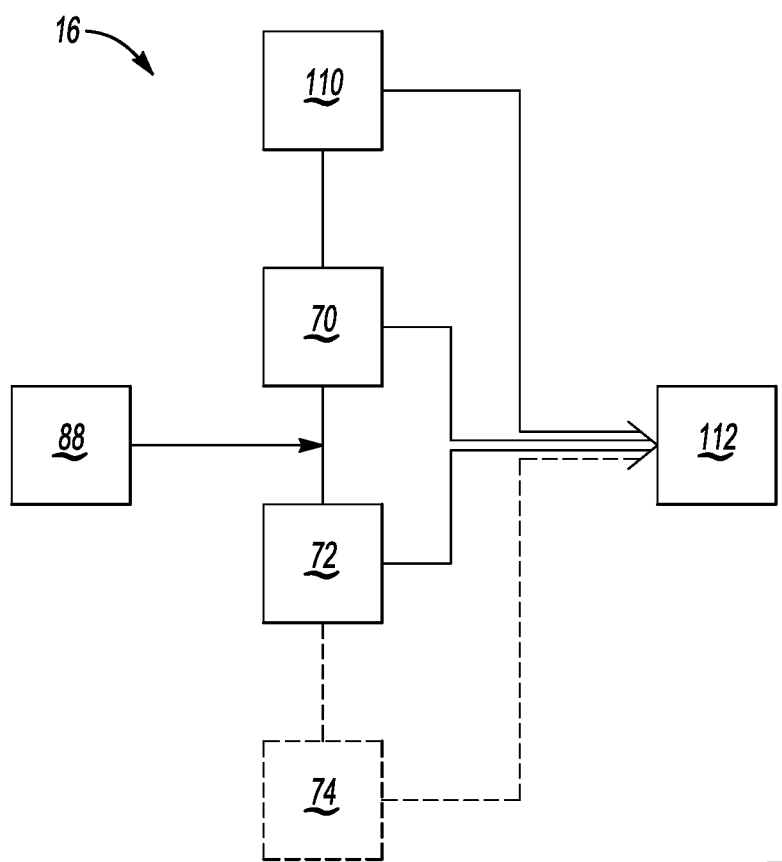
FIG. 3 is a flowchart of a method of operating the fuel cell stack of FIGS. 1 and 2.

Referring again to the method 16 as described with reference to FIGS. 1 and 3, the method 16 (FIG. 3) of operating the fuel cell stack 14 includes increasing 70 (FIG. 3) the first pressure 20 in the anode 26 via the controller 52 and, concurrent to increasing 70, decreasing 72 the second pressure 22 in the cathode 24 via the controller 52. Further, concurrent to decreasing 72, the method 16 may include maintaining 74 the relative humidity 58 of less than the threshold relative humidity in the cathode 24 via the controller 52.

In particular, increasing 70 may include enlarging a difference between the first pressure 20 and the second pressure 22 to thereby equilibrate a first partial pressure of nitrogen ($N_2$) in the anode 26 and a second partial pressure of nitrogen ($N_2$) in the cathode 24. That is, the method 16 may include controlling the first pressure 20 in the anode 26 and the second pressure 22 in the cathode 24 to reduce a partial pressure driving force between the cathode 24 and the anode 26 and thereby reduce or stop a nitrogen ($N_2$) permeation rate from the cathode 24 to the anode 26. For example, generally under nominal operating conditions, nitrogen ($N_2$) may flow from the cathode 24 through the polymer electrolyte membrane 28 to the anode 26 as shown in FIG. 1. However, when the temporarily disabled bleed valve 18 is undesirably disposed in the first position 40 such that accumulating nitrogen ($N_2$) cannot effectively drain from the anode 26, the method 16 may include manipulating the first pressure 20 and the second pressure 22 to direct the flow of nitrogen ($N_2$) from the anode 26 to the cathode 24 rather than from the cathode 24 to the anode 26.

Figure 4:
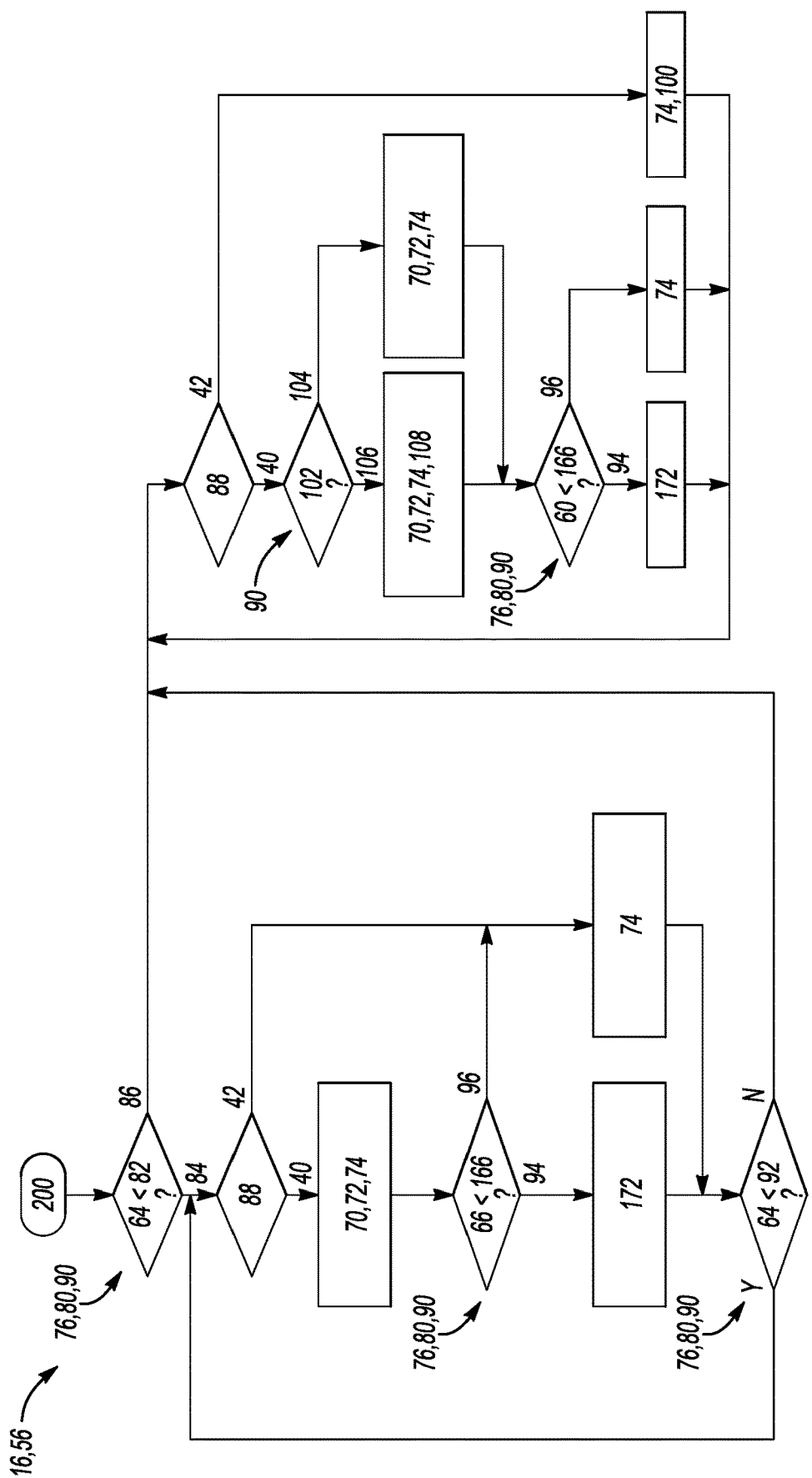
FIG. 4 is a flowchart of other aspects of the method of FIG. 3.

Further, hydrogen ($H_2$) may be present in the anode 26 in the hydrogen concentration 66 (FIG. 4). Increasing 70 and decreasing 72 may also include equalizing the first partial pressure and the second partial pressure to thereby stabilize the hydrogen concentration 66 in the anode 26. That is, as the first partial pressure and the second partial pressure equalize, the method 16 may also include steadying or preventing the hydrogen concentration 66 from fluctuating in the anode 26. More specifically, as the first pressure 20 in the anode 26 increases and the second pressure 22 in the cathode 24 decreases, the nitrogen ($N_2$) permeation rate may slow and eventually cease due to both the above-described reduced partial pressure driving force and/or due to low temperature operation of the fuel cell stack 14.

FIG. 4 illustrates in detail additional instructions 56 executable by the controller 52 and/or the processor 54 for increasing 70 the first pressure 20 while decreasing 72 the second pressure 22.

That is, referring to FIG. 4, upon start-up 200 of the fuel cell stack 14, the method 16 may further include, prior to increasing 70 the first pressure 20, measuring 76 the coolant inlet temperature 64 via the at least one temperature sensor 78. The method 16 may also include comparing 80 the coolant inlet temperature 64 to a threshold temperature 82 via the processor 54 to define: a first condition 84 in which the coolant inlet temperature 64 is less than the threshold temperature 82, or a second condition 86 in which the coolant inlet temperature 64 is greater than or equal to the threshold temperature 82. The threshold temperature 82 may be determined by calibration of the fuel cell stack 14 and may represent a temperature at which the coolant may be warm enough to melt ice or to indicate that the fuel cell stack 14 is nearing nominal operation. Therefore, the method 16 may include determining whether the coolant inlet temperature 64 is greater than a given threshold temperature 82.

For the first condition 84 and for the second condition 86, the method 16 may include, after comparing 80, detecting 88 via the controller 52 that the temporarily disabled bleed valve 18 is disposed in the first position 40. That is, the method 16 may include, prior to increasing 70, detecting 88 via the controller 52 that the temporarily disabled bleed valve 18 is disposed in the first position 40 and cannot transition to the second position 42, i.e., that the bleed valve 18 is in fact undesirably temporarily disabled and unable to drain nitrogen ($N_2$) from the anode 26.

However, for the first condition 84, if the bleed valve 18 is no longer temporarily disabled and is disposed in the second position 42, the method 16 may include setting or maintaining 74 the fuel cell stack power output 34 (FIG. 2) as required by the demand or use of the device 12 or system 10.

In addition, for the first condition 84, if the bleed valve 18 is no longer temporarily disabled and is disposed in the second position 42, the method 16 may include again determining 90 whether the coolant inlet temperature 64 is less than a second threshold temperature 92. That is, the method 16 may include again measuring 76 the coolant inlet temperature 64 via the at least one temperature sensor 78, and again comparing 80 the coolant inlet temperature 64 to the second threshold temperature 92 via the processor 54. The second threshold temperature 92 may likewise be determined by calibration of the fuel cell stack 14 and may represent a temperature at which the coolant is sufficiently warm enough to melt ice or to indicate that the fuel cell stack 14 is nearing nominal operation.

Finally, for the first condition 84, after determining 90 whether the coolant inlet temperature 64 is less than the second threshold temperature 92, the method 16 may include again detecting 88 via the controller 52 that the temporarily disabled bleed valve 18 is disposed in the first position 40.

Referring again to the first condition 84 in which the coolant inlet temperature 64 is less than the threshold temperature 82 and when the temporarily disabled bleed valve 18 is disposed in the first position 40, i.e., the temporarily disabled bleed valve 18 is stuck or frozen, the method 16 includes increasing 70 the first pressure 20 in the anode 26 via the controller 52, decreasing 72 the second pressure 22 in the cathode 24 via the controller 52, and maintaining 74 the relative humidity 58 in the cathode 24 to less than the threshold relative humidity via the controller 52 to thereby minimize the flow of nitrogen ($N_2$) from the cathode 24 to the anode 26.

Next, for the first condition 84 and when the temporarily disabled bleed valve 18 is disposed in the first position 40, decreasing 72 the second pressure 22 in the cathode 24 may include comparing 80 the hydrogen concentration 66 in the anode 26 to a threshold hydrogen concentration 166 to thereby define: a third condition 94 in which the hydrogen concentration 66 is less than the threshold hydrogen concentration 166, or a fourth condition 96 in which the hydrogen concentration 66 is greater than or equal to the threshold hydrogen concentration 166. As set forth above, the hydrogen concentration 66 in the anode 26 may be defined as a difference between 100% and a nitrogen concentration in the anode 26. The threshold hydrogen concentration 166 may be determined by calibration of the fuel cell stack 14 and may represent a hydrogen concentration in the anode 26 at which the fuel cell stack 14 may operate efficiently and stably, i.e., efficiently consume hydrogen ($H_2$) without starvation, during nominal operation. Therefore, the method 16 may include determining 90 whether the hydrogen concentration 66 in the anode 26 is less than a given threshold hydrogen concentration 166.

More specifically, referring again to FIG. 1, the system 10 may further include at least one of the hydrogen concentration sensor 162 and the hydrogen concentration model 62 in communication with the controller 52 and configured for estimating the hydrogen concentration 66 in the anode 26. The hydrogen concentration model 62 may be a software or calculation-based model that is capable of predicting the hydrogen concentration 66 in the anode 26 according to operating conditions of the fuel cell stack 14. Further, the controller 52 may be configured to limit the fuel cell stack power output 34 supplied from the fuel cell stack 14 to the electric machine 44 to thereby increase the hydrogen concentration 66.

That is, as explained in greater detail below, the method 16 allows the fuel cell stack 14 to be operated even while the bleed valve 18 is temporarily undesirably disposed in the first position 40 by both increasing 70 the first pressure 20 in the anode 26 and keeping the hydrogen concentration 66 in the anode 26 comparatively high.

If the hydrogen concentration 66 is less than the threshold hydrogen concentration 166, i.e., for the third condition 94, the method 16 may include decreasing 172 the fuel cell stack power output 34. That is, the fuel cell stack power output 34 may be limited to a calibrated value based on the hydrogen concentration model 62 for the fuel cell stack 14.

Alternatively or additionally, if the hydrogen concentration 66 is less than the threshold hydrogen concentration 166, i.e., for the third condition 94, the method 16 may also include raising the hydrogen concentration 66 in the anode 26. In one embodiment, raising the hydrogen concentration 66 in the anode 26 may occur along with or subsequent to increasing 70 the first pressure 20 and decreasing 72 the second pressure 22. That is, concurrently increasing 70 the first pressure 20 and decreasing 72 the second pressure 22 may occur prior to elevating the hydrogen concentration 66 in the anode 26 to greater than or equal to 10 parts by volume of hydrogen ($H_2$), e.g., greater than or equal to 20 parts by volume or greater than or equal to 25 parts by volume or greater than or equal to 30 parts by volume or greater than or equal to 35 parts by volume or greater than or equal to 40 parts by volume or greater than or equal to 45 parts by volume or greater than or equal to 50 parts by volume or greater than or equal to 55 parts by volume or greater than or equal to 60 parts by volume or greater than or equal to 65 parts by volume or greater than or equal to 70 parts by volume or greater than or equal to 75 parts by volume or greater than or equal to 80 parts by volume, based on 100 parts by volume of a total of nitrogen ($N_2$) and hydrogen ($H_2$) in the anode 26.

In another embodiment described with reference to FIG. 1, concurrently increasing 70 the first pressure 20 and decreasing 72 the second pressure 22 may include bypassing an expander 98 of the fuel cell stack 14. That is, as set forth above, the fuel cell stack 14 may be configured to emit the byproduct 36, i.e., water and heat, during operation. The fuel cell stack 14 may further include the exhaust 38 configured for conveying the byproduct 36 to atmosphere, and the expander 98 disposed between the cathode 24 and the exhaust 38 and configured for expanding the byproduct 36. However, for the method 16, the expander 98 may be bypassed to thereby increase the hydrogen concentration 66 in the anode 26.

Or, if the hydrogen concentration 66 is greater than or equal to the threshold hydrogen concentration 166, i.e., for the fourth condition 96, the method 16 may include maintaining 74 the fuel cell stack power output 34. Then, the method 16 may subsequently include again determining 90 whether the coolant inlet temperature 64 is less than the second threshold temperature 92.

However, if the coolant inlet temperature 64 is greater than or equal to the second threshold temperature 92, or for the second condition 86 in which the coolant inlet temperature 64 is greater than or equal to the threshold temperature 82, the method 16 may include detecting 88 via the controller 52 whether the temporarily disabled bleed valve 18 is disposed in the first position 40.

If the bleed valve 18 is not temporarily disabled but is instead disposed in the second position 42 as desired, the method 16 may include setting or maintaining 74 the fuel cell stack power output 34 as required by the demand or use of the device 12 or system 10. In addition, for automotive applications or other applications requiring an operator, the system 10 and device 12 may include a malfunction indicator lamp signal, e.g., a check-engine light, that may warn an operator regarding a malfunction or non-nominal operating condition. However, if the temporarily disabled bleed valve 18 transitions from the first position 40 to the second position 42 as desired, the method 16 may include clearing 100 or canceling the malfunction indicator lamp signal. The method 16 may then subsequently include periodically detecting 88 via the controller 52 whether the temporarily disabled bleed valve 18 is disposed in the first position 40 and cannot transition to the second position 42, i.e., whether the bleed valve 18 is stuck or frozen.

Referring again to FIG. 4, for the second condition 86 in which the coolant inlet temperature 64 is greater than or equal to the threshold temperature 82 and when the controller 52 detects that the temporarily disabled bleed valve 18 is disposed in the first position 40 and cannot transition to the second position 42, e.g., when the temporarily disabled bleed valve 18 is stuck closed or stuck open, the method 16 may further include, prior to comparing 80 the hydrogen concentration 66 to the threshold hydrogen concentration 166, determining 90 whether the fuel cell stack 14 has reached a fully-warmed state 102. That is, the method 16 may include determining 90 if the fuel cell stack is sufficiently heated to enable efficient operation of the bleed valve 18.

For a first state 104 in which the fuel cell stack 14 has not yet reached the fully-warmed state 102, the method 16 includes increasing 70 the first pressure 20 in the anode 26 via the controller 52, decreasing 72 the second pressure 22 in the cathode 24 via the controller 52, and maintaining 74 the relative humidity 58 of less than the threshold relative humidity in the cathode 24 via the controller 52.

Alternatively, for a second state 106 in which the fuel cell stack 14 has reached the fully-warmed state 102, the method 16 may also include sending 108 the malfunction indicator lamp signal to the operator in addition to concurrently increasing 70 the first pressure 20, decreasing 72 the second pressure 22, and maintaining 74 the relative humidity 58 of less than the threshold relative humidity in the cathode 24.

Next, as described with continued reference to FIG. 4, the method 16 may include comparing 80 the hydrogen concentration 66 in the anode 26 to the threshold hydrogen concentration 166 to thereby define: the third condition 94 in which the hydrogen concentration 66 is less than the threshold hydrogen concentration 166, or the fourth condition 96 in which the hydrogen concentration 66 is greater than or equal to the threshold hydrogen concentration 166.

For the third condition 94, the method 16 may include decreasing 172 the fuel cell stack power output 34. That is, the fuel cell stack power output 34 may be limited to the calibrated value based on the hydrogen concentration model 62 for the fuel cell stack 14. Or, for the fourth condition 96, the method 16 may include maintaining 74 the fuel cell stack power output 34. Then, after decreasing 172 or maintaining 74, the method 16 may subsequently include again determining 90 whether the coolant inlet temperature 64 is less than the second threshold temperature 92.

In summary, the method 16 may include, concurrent to decreasing 72 the second pressure 22 in the cathode 24, producing and sustaining 110 the fuel cell stack power output 34 sufficient to power the device 12 for at least one hour while the temporarily disabled bleed valve 18 is disposed in the first position 40. As the fuel cell stack 14 operates, the fuel cell stack 14 may consequently heat up or warm. As such, the method 16 may further include warming 112 the temporarily disabled bleed valve 18 to thereby transition the temporarily disabled bleed valve 18 from the first position 40 to the second position 42. That is, as the fuel cell stack 14 warms due to continued operation, the fuel cell stack 14 may generate sufficient heat to thaw, e.g., open or close, a frozen bleed valve 18 and enable nitrogen ($N_2$) to bleed from the fuel cell stack 14.

Therefore, the method 16, system 10, and device 12 are robust and enable operation of the fuel cell stack 14 even when the temporarily disabled bleed valve 18 cannot transition to the second position 42. Further, the method 16 may eliminate a need for auxiliary heaters or other components to ensure consistent valve operation. In addition, the method 16, system 10, and device 12 enable immediate use of and power generation by the fuel cell stack 14 without requiring time- and fuel-consuming warm-up periods for the fuel cell stack 14.

While the best modes for carrying out the disclosure have been described in detail, those familiar with the art to which this disclosure relates will recognize various alternative designs and embodiments for practicing the disclosure within the scope of the appended claims.

What is claimed is:

1. A method of operating a fuel cell stack, wherein the fuel cell stack includes a cathode, an anode, and a temporarily disabled bleed valve that is otherwise configured to transition from a first position to a second position and thereby modulate nitrogen drained from the anode, the method comprising:
   increasing a first pressure in the anode via a controller; and
   concurrent to increasing, decreasing a second pressure in the cathode via the controller.

2. The method of claim 1, further comprising, concurrent to decreasing, maintaining a relative humidity of less than a threshold relative humidity in the cathode via the controller.

3. The method of claim 1, wherein increasing includes enlarging a difference between the first pressure and the second pressure to thereby equilibrate a first partial pressure of nitrogen in the anode and a second partial pressure of nitrogen in the cathode.

4. The method of claim 3, wherein hydrogen is present in the anode in a hydrogen concentration, and further wherein increasing and decreasing include equalizing the first partial pressure and the second partial pressure to thereby stabilize the hydrogen concentration in the anode.

5. The method of claim 1, further including, prior to increasing, detecting via the controller that the temporarily disabled bleed valve is disposed in the first position and cannot transition to the second position.

6. The method of claim 1, wherein the fuel cell stack is configured to emit a byproduct during operation;
   wherein the fuel cell stack further includes:
      an exhaust configured for conveying the byproduct to atmosphere; and
      an expander disposed between the cathode and the exhaust and configured for expanding the byproduct; and
   further wherein decreasing includes bypassing the expander.

7. The method of claim 1, wherein decreasing includes elevating a hydrogen concentration in the anode to greater than or equal to 10 parts by volume of hydrogen based on 100 parts by volume of a total of nitrogen and hydrogen.

8. The method of claim 1, further including, concurrent to decreasing, producing and sustaining a fuel cell stack power output sufficient to power a device for a predetermined duration while the temporarily disabled bleed valve is disposed in the first position.

9. The method of claim 1, further including warming the temporarily disabled bleed valve to thereby transition the temporarily disabled bleed valve from the first position to the second position.

10. The method of claim 1, further comprising, prior to increasing the first pressure:
    measuring a coolant inlet temperature via at least one temperature sensor;
    comparing the coolant inlet temperature to a threshold temperature via a processor to define:
       a first condition in which the coolant inlet temperature is less than the threshold temperature; or
       a second condition in which the coolant inlet temperature is greater than or equal to the threshold temperature; and
    after comparing, detecting via the controller that the temporarily disabled bleed valve is disposed in the first position.

11. The method of claim 10, wherein decreasing includes comparing a hydrogen concentration in the anode to a threshold hydrogen concentration to thereby define:
    a third condition in which the hydrogen concentration is less than the threshold hydrogen concentration; or
    a fourth condition in which the hydrogen concentration is greater than or equal to the threshold hydrogen concentration; and
    for the third condition, decreasing a fuel cell stack power output; or
    for the fourth condition, maintaining the fuel cell stack power output.

12. The method of claim 11, further including, prior to comparing the hydrogen concentration to the threshold hydrogen concentration, determining whether the fuel cell stack has reached a fully-warmed state.

13. A system comprising:
    a fuel cell stack including a cathode, an anode, and a temporarily disabled bleed valve that is otherwise configured to transition from a first position to a second position and thereby modulate nitrogen drained from the anode;
    an electric machine electrically connected to and powered by the fuel cell stack; and
    a controller in communication with the fuel cell stack, having a processor, and configured to maintain operation of the fuel cell stack when the temporarily disabled bleed valve is disposed in the first position via execution of instructions by the processor, wherein execution of the instructions causes the controller to concurrently:

increase a first pressure in the anode; and decrease a second pressure in the cathode.

14. The system of claim 13, wherein execution of the instructions further causes the controller to concurrently maintain a relative humidity of less than a threshold relative humidity in the cathode.

15. The system of claim 13, wherein the controller is configured to inject hydrogen into the anode to thereby increase the first pressure.

16. The system of claim 13, further including at least one of a hydrogen concentration sensor and a hydrogen concentration model in communication with the controller and configured for estimating a hydrogen concentration in the anode, and further wherein the controller is configured to limit a fuel cell stack power output supplied from the fuel cell stack to the electric machine to thereby increase the hydrogen concentration.

17. A device comprising:

a set of drive wheels;

a fuel cell stack including a cathode, an anode, and a temporarily disabled bleed valve that is otherwise configured to transition from a first position to a second position and thereby modulate nitrogen drained from the anode;

an electric traction motor electrically connected to and powered by the fuel cell stack, wherein the electric traction motor has an output member coupled to the set of drive wheels; and a controller in communication with the fuel cell stack, having a processor, and configured to maintain operation of the fuel cell stack when the temporarily disabled bleed valve is disposed in the first position via execution of instructions by the processor, wherein execution of the instructions causes the controller to concurrently:

increase a first pressure in the anode; and decrease a second pressure in the cathode.

18. The device of claim 17, wherein execution of the instructions further causes the controller to maintain a relative humidity of less than a threshold relative humidity in the cathode while concurrently increasing the first pressure and decreasing the second pressure.

19. The device of claim 17, wherein the fuel cell stack powers the set of drive wheels for a predetermined duration while the temporarily disabled bleed valve is disposed in the first position.

* * * * *